United States Patent
Yu et al.

(10) Patent No.: US 7,101,070 B2
(45) Date of Patent: Sep. 5, 2006

(54) BACKLIGHT SYSTEM AND LIQUID CRYSTAL DISPLAY USING THE SAME

(75) Inventors: Tai-Chen Yu, Tu-Chen (TW); Charles Leu, Tu-chen (TW); Ga-Lane Chen, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 161 days.

(21) Appl. No.: 10/682,940

(22) Filed: Oct. 9, 2003

(65) Prior Publication Data

US 2004/0145914 A1    Jul. 29, 2004

(30) Foreign Application Priority Data

Jan. 29, 2003    (TW) ............................... 92201641 U

(51) Int. Cl.
  *F21V 13/04*    (2006.01)
  *G02B 5/02*    (2006.01)
  *G02F 1/13357*    (2006.01)

(52) U.S. Cl. ................... 362/558; 362/27; 362/561; 362/608; 362/612; 362/613; 362/622; 362/624

(58) Field of Classification Search ............... 362/23, 362/24, 26, 27, 31, 85, 246, 558, 561, 608–610, 362/612, 613, 621, 600, 615, 622, 624
See application file for complete search history.

(56) References Cited

U.S. PATENT DOCUMENTS

| | | | |
|---|---|---|---|
| 3,040,168 A * | 6/1962 | Stearns | 362/27 |
| 5,420,761 A * | 5/1995 | DuNah et al. | 362/31 |
| 5,709,447 A * | 1/1998 | Murakami et al. | 362/621 |
| 5,727,862 A * | 3/1998 | Wu | 362/27 |
| 5,926,033 A * | 7/1999 | Saigo et al. | 326/31 |
| 6,494,585 B1 * | 12/2002 | Wada | 362/26 |
| 6,601,962 B1 * | 8/2003 | Ehara et al. | 362/612 |
| 6,623,132 B1 * | 9/2003 | Lekson et al. | 362/31 |
| 6,733,147 B1 * | 5/2004 | Wang et al. | 362/26 |
| 6,976,779 B1 * | 12/2005 | Ohtsuki et al. | 362/608 |
| 2005/0174803 A1 * | 8/2005 | Hayashi et al. | 362/608 |

FOREIGN PATENT DOCUMENTS

TW    354654    3/1999

* cited by examiner

*Primary Examiner*—Alan Cariaso
(74) *Attorney, Agent, or Firm*—Wei Te Chung

(57) ABSTRACT

A backlight system (100) in accordance with the present invention includes a plurality of light sources (110) for emitting light beams and a light guide plate (120) for receiving the light beams emitted by the light sources. The light guide plate includes a light input surface (121) and a light output surface (122) joining the light input surface. The light input surface has a plurality of protrusions (124) thereon. The light beams are refracted and diffused by the protrusions, and are then transmitted through the light guide plate to be emitted with a high degree of uniformity through the light output surface.

15 Claims, 4 Drawing Sheets

BACKLIGHT SYSTEM AND LIQUID CRYSTAL DISPLAY USING THE SAME

BACKGROUND OF THE INVENTION

1. Field of the Invention

The present invention relates to a backlight device and particularly to an edge light type backlight device for use in a liquid crystal display (LCD) or the like.

2. The Related Arts

An LCD device comprises, for example, a liquid crystal display panel and a backlight system mounted under the liquid crystal display panel for supplying light beams thereto. The backlight system mainly comprises a light source and a light guide plate, wherein the light guide plate is made of a transparent acrylic plastic plate and is used for guiding the light beams emitted by the light source to uniformly illuminate the liquid crystal display panel.

The light source emits light beams into the light guide plate, wherein the light beams are totally internally reflected. In order to diffuse the light beams and emit them uniformly from a top surface of the light guide plate, protrusions or recesses are located on a bottom surface of the light guide plate, or a plurality of light diffusion dot-patterns are formed on the bottom surface of the light guide plate.

Referring to FIG. 7 and FIG. 8, a conventional backlight system 9 comprises a plurality of light sources 40, which can be light emitting diodes, miniature bulbs, or other point sources, a cage 30 having a reflective coating thereon, a light guide plate 10, and a translucent sheet 20. The cage 30 has a plurality of locating grooves 31 therein. The light guide plate 10 comprises a light input surface 11 and a light output surface 12.

In assembly, the light sources 40 are arranged in the locating grooves 31 of the cage 30, and the light guide plate 10 is accommodated in the cage 30. The light input surface 11 of the light guide plate 10 is close to the light sources 40. The translucent sheet 20 is placed upon the light guide plate 10.

In operation, light beams emitted by the light sources 40 pass through the light input surface 11 and enter into the light guide plate 10, and then are transmitted out from the light output surface 12 of the light guide plate 10. After that, the light beams pass through the translucent sheet 20 to illuminate an LCD panel.

However, the light sources 40 have a certain emitting angle. For example, light emitting diodes used as the light sources 40 emit light beams with an emitting angle in a range of 30° to 130°. Referring to FIG. 8, because the light beams are refracted at the light input surface 11 when they pass there through, the emitting angle of the light beams is decreased. The largest emitting angle is about 119.653°. Therefore, the light guide plate 10 yields a plurality of dark areas 13, from which fewer light beams are emitted. Thus, the uniformity of emission from the light guide plate 10 is impaired.

It is desirable to provide an improved backlight system for use in a liquid crystal display, which overcomes the above problems.

SUMMARY OF THE INVENTION

An object of the present invention is to provide a backlight system that emits light with a high degree of uniformity.

A backlight system in accordance with the present invention comprises a plurality of light sources for emitting light beams and a light guide plate for receiving the light beams emitted by the light sources. The light guide plate comprises a light input surface and a light output surface joining the light input surface. The light input surface comprises a plurality of protrusions thereon, and the light beams emitted by the light sources are transmitted through the light guide plate after being refracted and diffused by the protrusions.

Other objects, advantages, and novel features of the present invention will become more apparent from the following detailed description when taken in conjunction with the accompanying drawings.

DETAILED DESCRIPTION OF THE INVENTION

Figure 1:
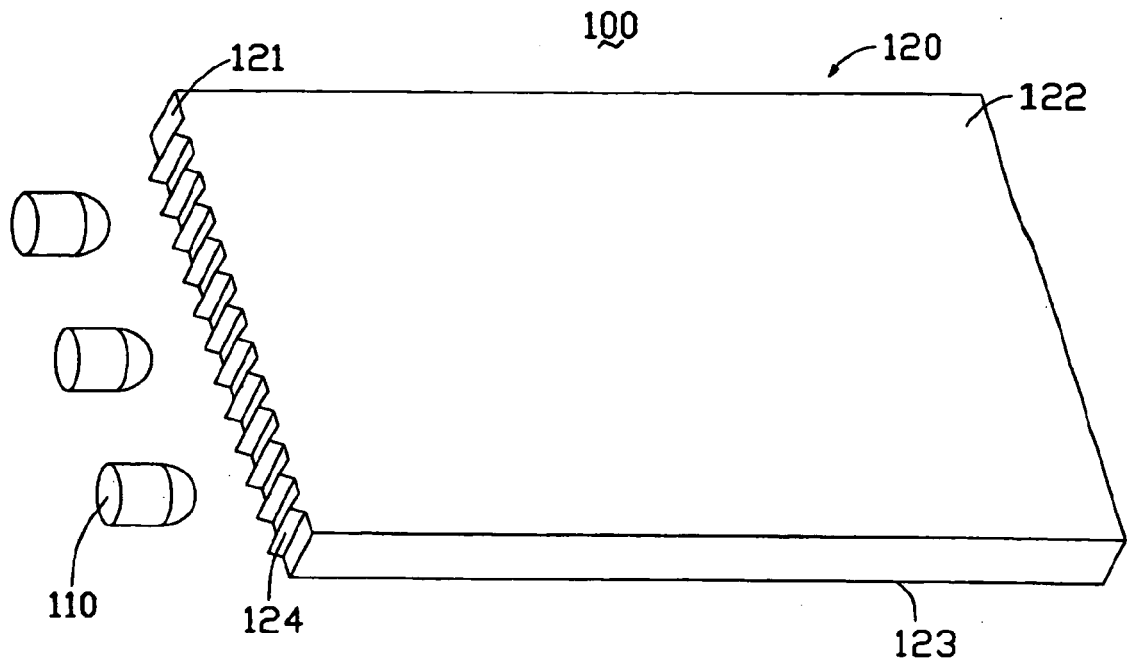
FIG. 1 is a perspective view of a backlight system according to the present invention.

Referring to FIG. 1, a backlight system 100 in accordance with the present invention is used to illuminate a liquid crystal display device. The backlight system 100 comprises a plurality of light sources 110 and a light guide plate 120. The light sources 110 emit light, and the light guide plate 120 is arranged close to the light sources 110 to receive the light emitted by the light sources 110.

The light sources 110 can be light emitting diodes, miniature bulbs, or the like. The luminance of the light sources 110 can be adjusted.

Figure 2:
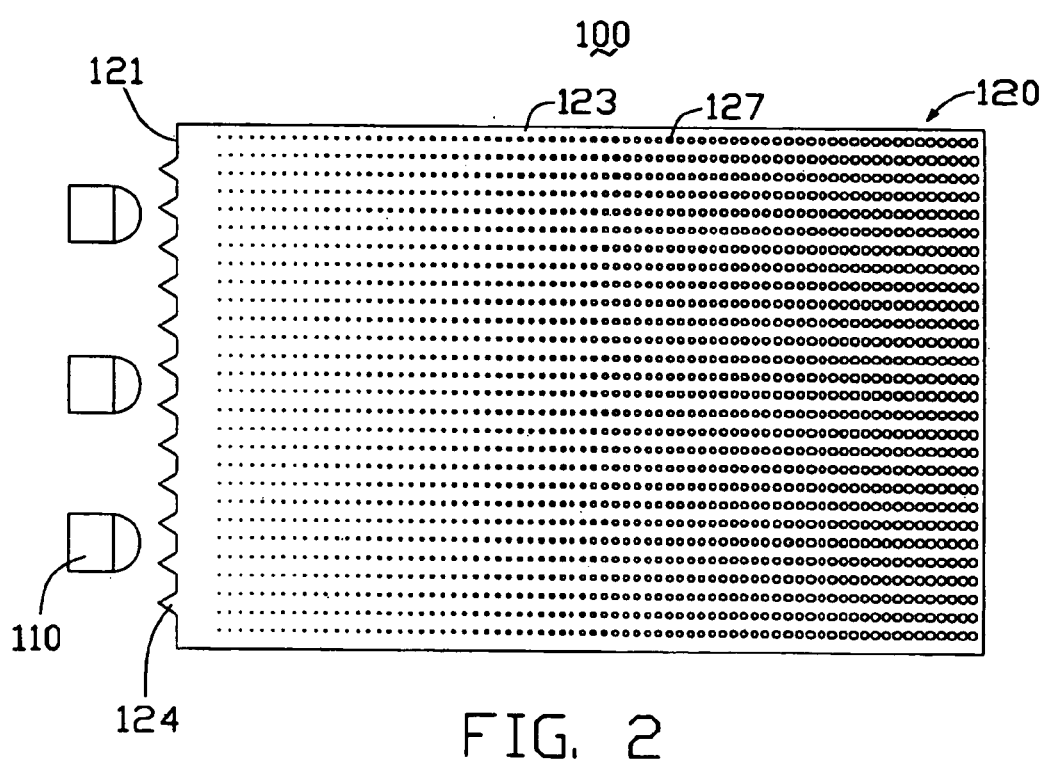
FIG. 2 is a bottom view of the backlight system in FIG. 1.

Referring to FIG. 2, the light guide plate 120 is a planar plate and can be made of a transparent acrylic plastic. The light guide plate 120 comprises a light input surface 121, a light output surface 122 joining the light input surface 121, and a bottom surface 123 opposite to the light output surface 122. The light input surface 121 comprises a plurality of protrusions 124 thereon. The protrusions 124 are in the shape of a triangle or a trapezoid, and can be manufactured by molding or by using a v-cut method. The protrusions 124 may or may not be arranged at intervals, and are arranged opposite the light sources 110 to refract and diffuse the light beams emitted by the light sources 110. The bottom surface 123 of the light guide plate 120 has a dot-pattern 127 thereon, for improving the uniformity of light emission from the light guide plate 120. The dot-pattern 127 can be manufactured by printing reflective dots (not labeled) or by molding projection (not labeled) the bottom surface 123. The size of the dots in the dot-pattern 127 increases in a direction away from the light input surface 121. The shape of each dot can be hemispherical, cylinder, square, or cone-shaped. Moreover, a plurality of v-cut grooves (not show) can be formed in the bottom surface 123 to substitute for the dot-pattern 127.

Figure 3:
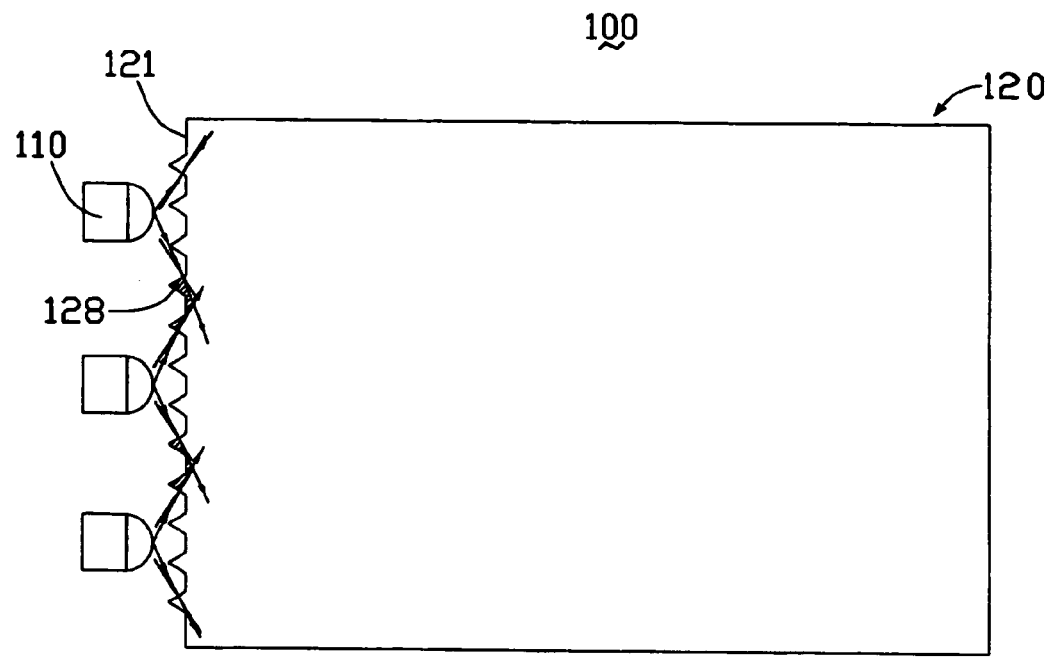
FIG. 3 is a partial essential optical paths diagram of the backlight system.
Figure 8:
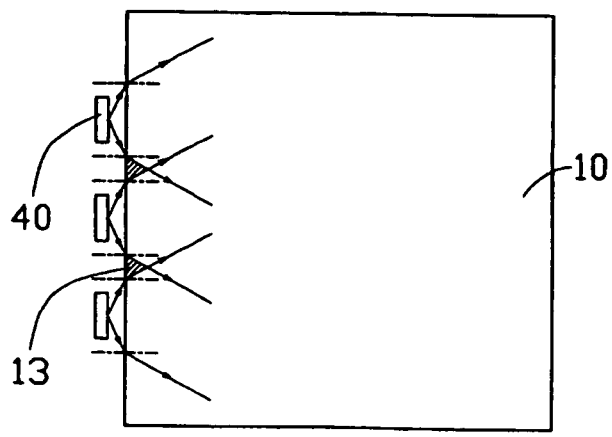
FIG. 8 is a partial essential optical paths diagram of the prior art backlight system in FIG. 7.

FIG. 3 shows a partial essential optical paths diagram of the backlight system 100 using light emitting diodes as light sources 110. Each light source 110 has an emitting angle in a range of 30° to 130°. Light beams emitted by the light sources 110 are refracted and diffused by the protrusions 124 when they enter into the light guide plate 120. Compare with the prior art (FIG. 8), the emitting angle of the light beams is increased. The largest emitting angle is about 129.01°.

Figure 4:
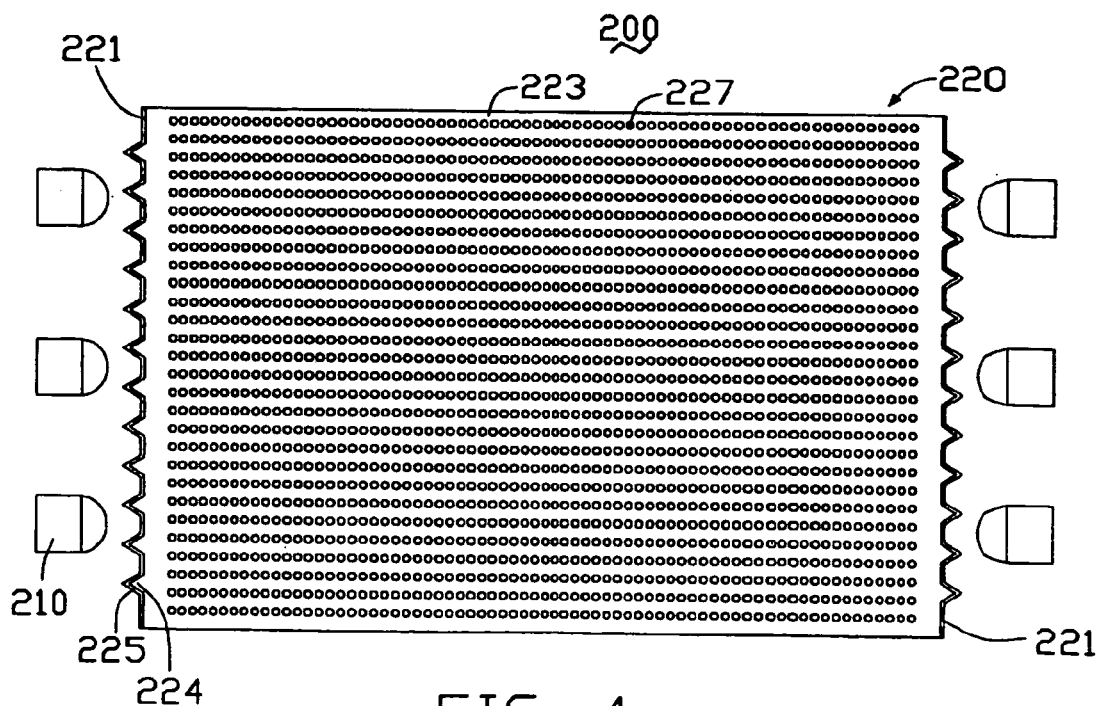
FIG. 4 is a bottom view of a embodiment of a backlight system according to the present invention.

FIG. 4 shows a second embodiment of a backlight system 200 in accordance with the present invention, which is similar to the backlight system 100. The backlight system 200 comprises a plurality of light sources 210 and a light guide plate 220. The light guide plate 220 comprises two light input surfaces 221 and a bottom surface 223, wherein each light input surface 221 has a plurality of triangle protrusions 224 thereon. The protrusions 224 of each light input surface 221 may or not be are arranged at intervals, and are opposite to the light sources 210. Each light input surface 221 further comprises an anti-reflective film 225 thereon, which covers the light input surfaces 221 and the protrusions 224. The anti-reflective films 225 can improve an effective utilization of the light beams emitted by the light sources 210 and entering into the light guide plate 220. The bottom surface 223 comprises a dot-pattern 227 thereon, which has regularly arranged dots (not labeled) to enhance the optical characteristics of the light guide plate 200.

Figure 5:
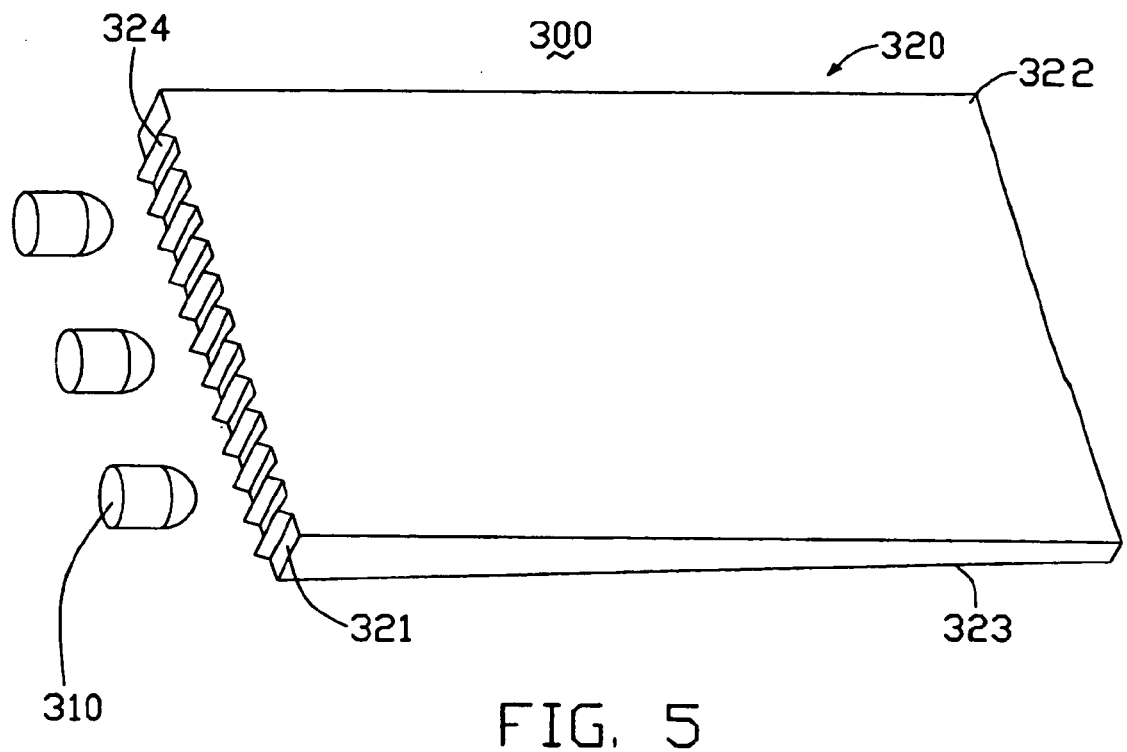
FIG. 5 is a perspective view of a third embodiment of a backlight system according to the present invention.

FIG. 5 shows a third embodiment of a backlight system 300 in accordance with the present invention. The backlight system 300 comprises a plurality of light sources 310 and a light guide plate 320, wherein the light guide plate 320 is in a shape of a wedge. The light guide plate 320 comprises a light input surface 321, a light output surface 322 and a bottom surface 323 opposite to the light output surface 322. The light input surface 321 has a plurality of protrusions 324 thereon. Light beams emitted by the light sources 310 are refracted and diffused by the protrusions 324 when they enter into the light guide plate 320. Compare with the prior art (FIG. 8), the emitting angle of the light beams is increased. The bottom surface 323 has a reflective coating (not show) thereon, which reflects the light beams to prevent the light beams from transmitting out of the light guide plate 320 through the bottom surface 323.

Figure 6:
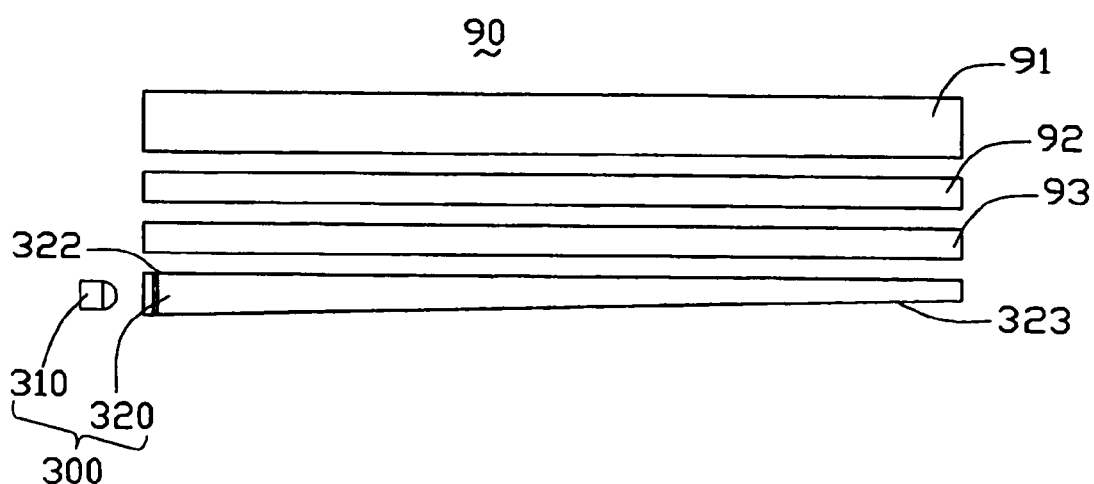
FIG. 6 is a schematic view of a liquid crystal display device using the backlight system in FIG. 5.
Figure 7:
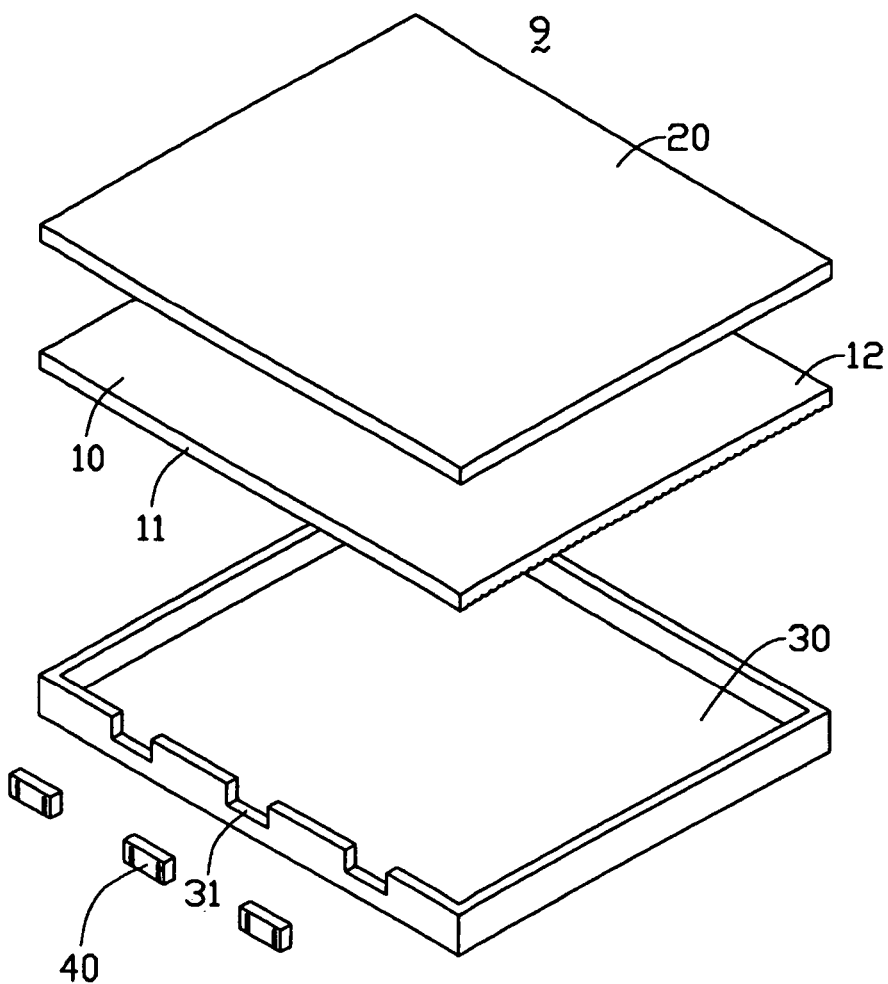
FIG. 7 is a prior art backlight system.

FIG. 6 shows a LCD device 90 using the backlight system 300. The LCD device 90 comprises the backlight system 300, a diffusion sheet 93, a prism sheet 92 and a liquid crystal panel 91 which are arranged in order. The backlight system 300 is arranged under the liquid crystal panel 91, and comprises a plurality of light sources 310 and a light guide plate 320. In operation, light beams emitted by the light sources 310 enter into the light guide plate 320, and are then transmitted out from the light output surface 322, and then pass through the diffusion sheet 93 and the prism sheet 92 to illuminate the liquid crystal panel 91.

Advantages of the present invention over the prior art include the following. The protrusions refract and diffuse the light beams which enter into the light guide plate, increasing the emitting angle of the light beams emitted by the light sources is increased, so that the extent of the dark areas is minimized, and light is emitted from the light guide plate with a high degree of uniformity.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What claimed is:

1. A backlight system for a display device, comprising:
   a plurality of light sources for emitting light beams; and
   a light guide plate for receiving the light beams emitted by the light sources, which light guide plate comprises a light input surface and a light output surface joining the light input surface;
   wherein the light input surface has a plurality of protrusions thereon, which are arranged at intervals and are triangular in shape, for refracting and diffusing the light beams emitted by the light sources, the light beams then being transmitted through the light guide plate for output through the light output surface.

2. The backlight system as claimed in claim 1, wherein the light input surface has an anti-reflection coating thereon.

3. The backlight system as claimed in claim 1, wherein the light sources are one or more light emitting diodes and/or miniature bulbs.

4. The backlight system as claimed in claim 1, wherein the light guide plate is a planar plate or a wedge-shape plate.

5. The backlight system as claimed in claim 1, wherein the light guide plate further comprises a bottom surface opposite to the light output surface.

6. The backlight system as claimed in claim 5, wherein the bottom surface has a dot-pattern thereon.

7. The backlight system as claimed in claim 1, wherein each light source is positioned a distance away from the light input surface, each light source being configured and positioned so as to be capable of providing incident light upon a plurality of faces of at least one triangular protrusion.

8. A liquid crystal display device, comprising:
   a liquid crystal panel; and
   a backlight system arranged under the liquid crystal panel for illuminating it, the backlight system comprising:
   a plurality of light sources for emitting light beams; and
   a light guide plate for receiving the light beams emitted by the light sources, which light guide plate comprises a light input surface and a light output surface joining the light input surface;
   wherein the light input surface has a plurality of protrusions thereon, which are arranged at intervals and are triangular in shape, for refracting and diffusing the light beams emitted by the light sources, the light beams then being transmitted through the light guide plate for output through the light output surface.

9. The liquid crystal display device as claimed in claim 8, wherein the light input surface has an anti-reflection coating thereon.

10. The liquid crystal display device as claimed in claim 8, wherein the light sources are one or more light emitting diodes and/or miniature bulbs.

11. The liquid crystal display device as claimed in claim 8, wherein the light guide plate is a planar plate or a wedge plate.

12. The liquid crystal display device as claimed in claim 8, wherein each light source is positioned a distance away from the light input surface, each light source being configured and positioned so as to be capable of providing incident light upon a plurality of faces of at least one triangular protrusion.

13. A backlight system, comprising:
   a light guide plate defining a light input surface and a light output surface;
   a plurality of light sources disposed beside the light input surface; and spaced triangular-shaped protrusions formed on the light input surface for increasing an incident angle of light emitted from the corresponding light source so as to obtain relatively large angled diffusion of said light in the light guide plate.

14. The backlight system as claimed in claim 13, wherein each of the protrusions is relatively small in comparison with an emitting portion of the corresponding light source.

15. The backlight system as claimed in claim 13, wherein each light source is a dot light source, each dot light source being positioned a distance away from the light input surface, each dot light source being configured for providing light beams upon a plurality of said triangular-shaped protrusions on the input surface.

* * * * *